United States Patent Office 3,431,988
Patented Mar. 11, 1969

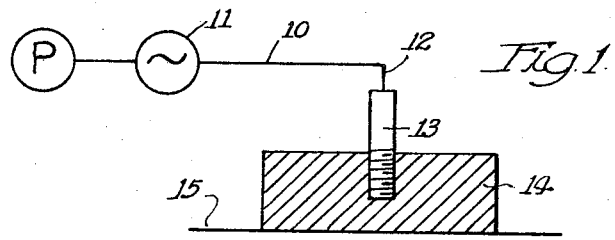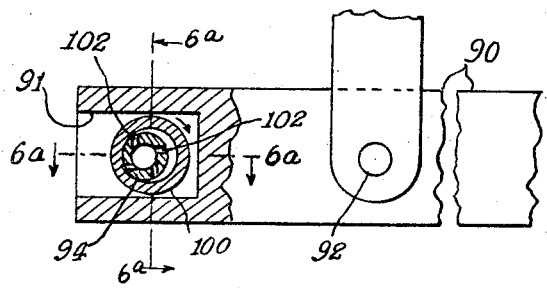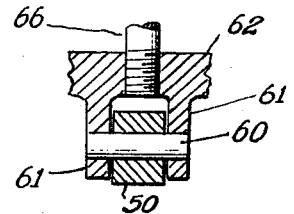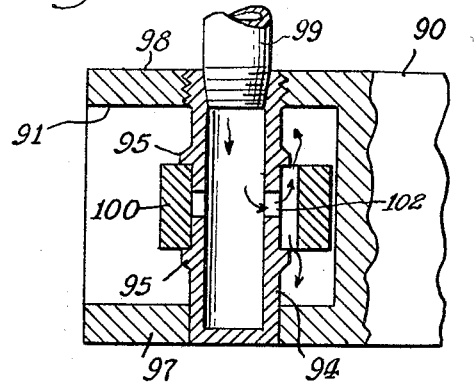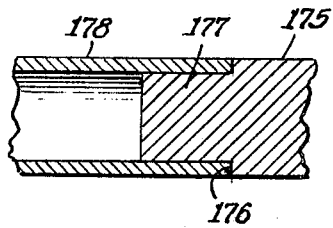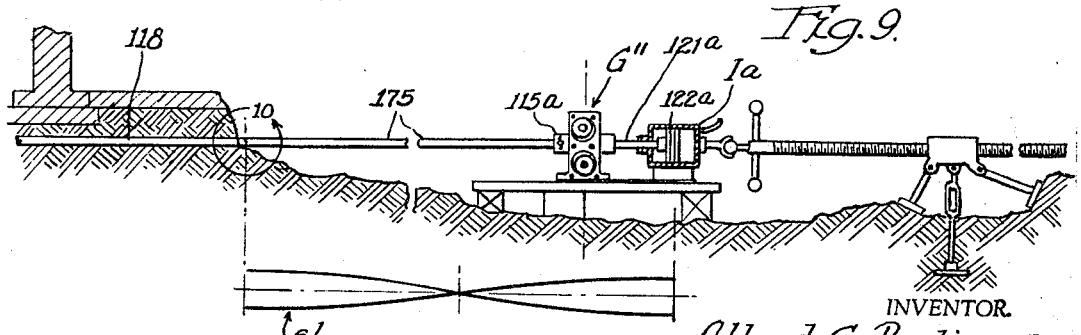

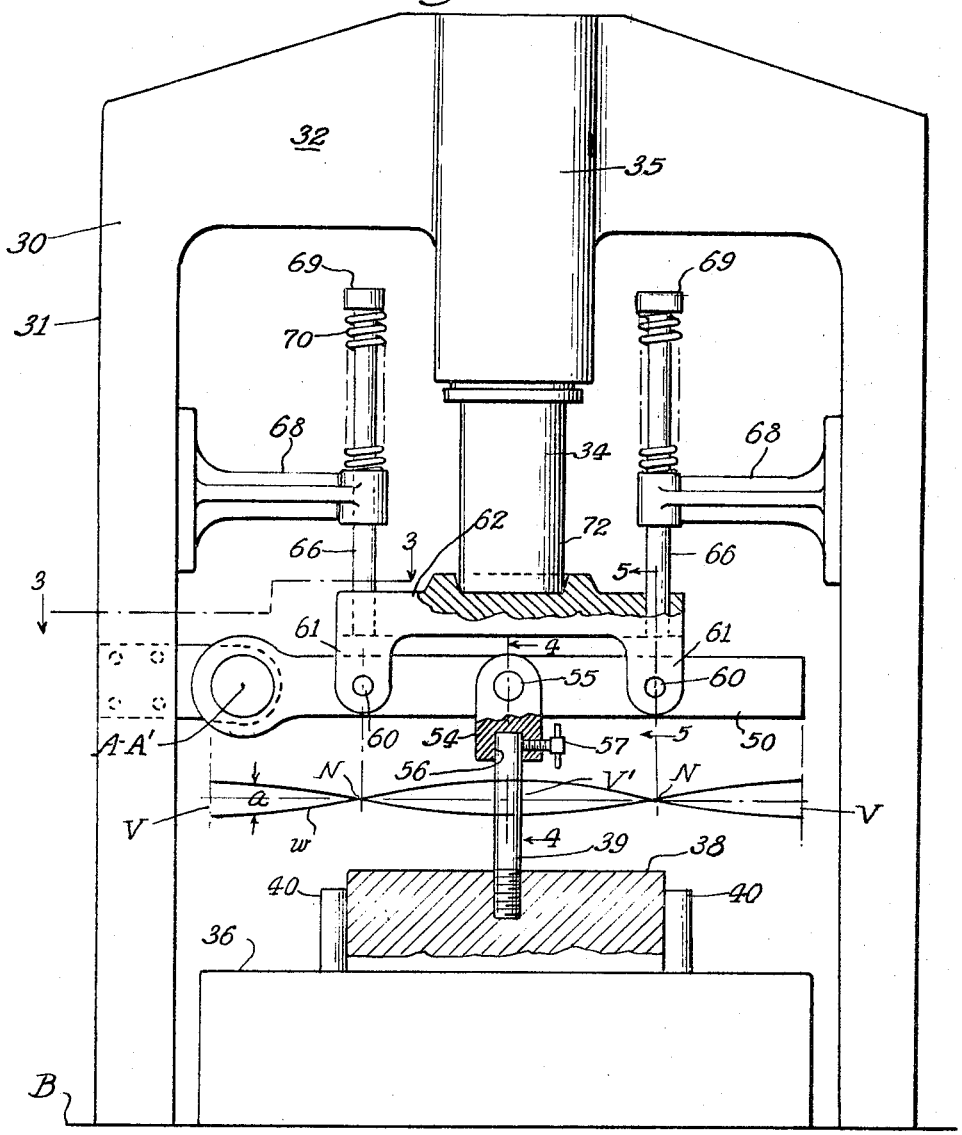
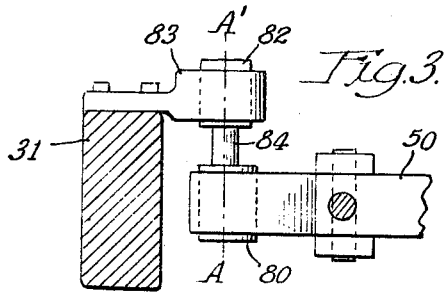
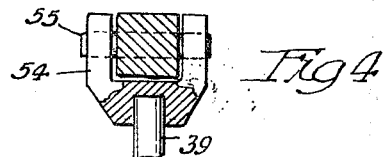

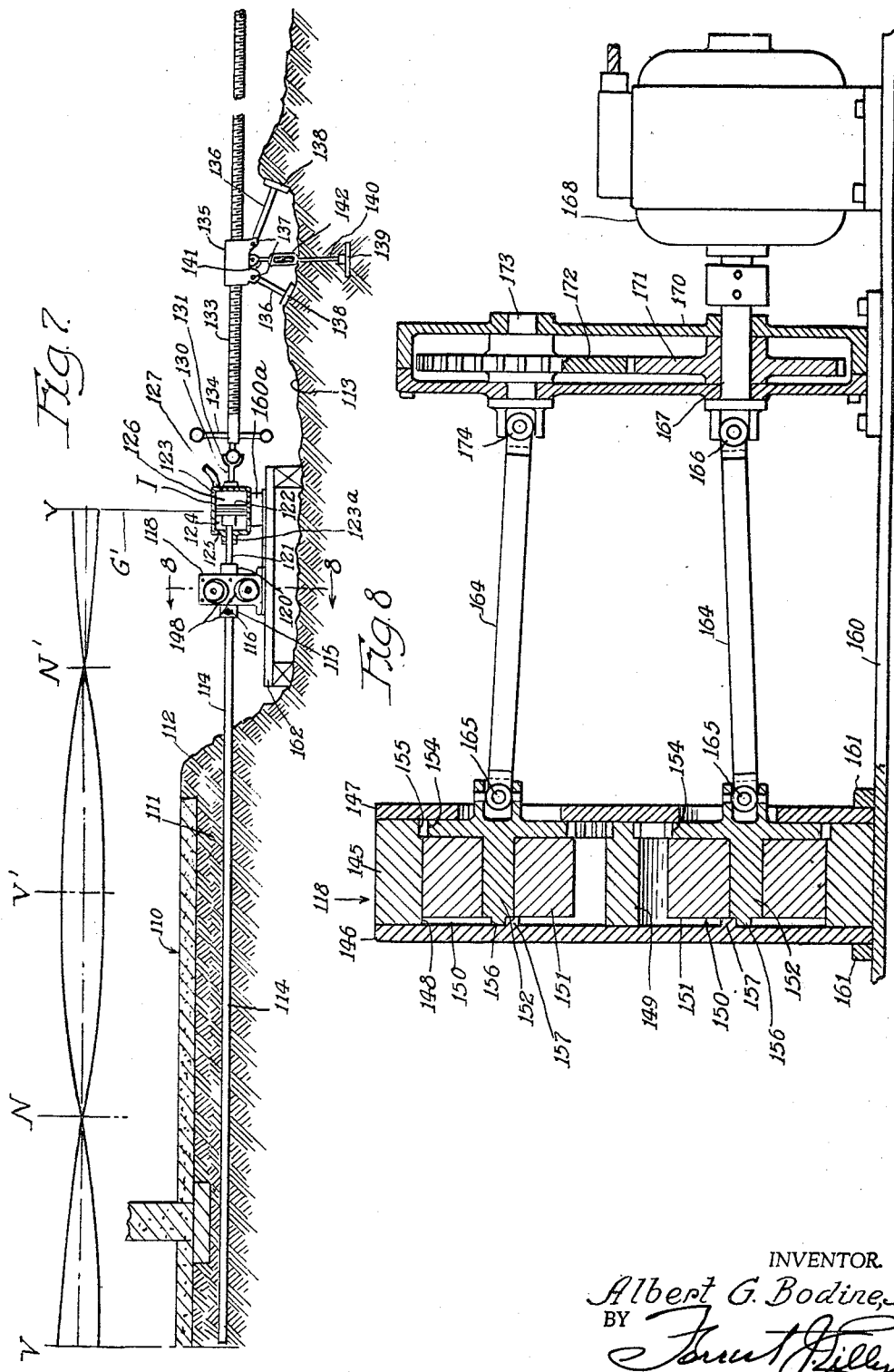

3,431,988
SONIC METHOD AND APPARATUS FOR INSERT-
ING FASTENING ELEMENTS INTO PLASTIC
COMPLIANT BODIES
Albert G. Bodine, Jr., Los Angeles, Calif.
(7877 Woodley Ave., Van Nuys, Calif. 91406)
Continuation-in-part of application Ser. No. 441,209,
Mar. 19, 1965, which is a continuation-in-part of
application Ser. No. 423,771, Jan. 6, 1965. This
application Jan. 20, 1966, Ser. No. 521,948
U.S. Cl. 175—56                           9 Claims
Int. Cl. E21c *11/00;* E01g *3/00;* E02f *5/18*

ABSTRACT OF THE DISCLOSURE

A method for driving inserts, including studs, pins and the like, into bodies of parent material which is plastic or plastically deformable, comprising applying sonic energy to the insert while said insert is being driven into the parent material.

---

This application is a continuing application of my prior applications as follows: Ser. No. 756,382, filed Aug. 21, 1958, entitled Sonic Method and Apparatus for Extruding Flowable Materials, now Patent No. 3,169,589; Ser. No. 275,157, filed Apr. 23, 1963, as a continuation-in-part of Ser. No. 756,382, entitled Method and Apparatus for Forming Plastic Materials, now Patent No. 3,233,012 and Ser. No. 423,771, filed Jan. 6, 1965, as a continuation-in-part of Ser. No. 756,382, entitled Sonic Press Fitting System; and Ser. No. 441,209, filed Mar. 19, 1965, now Patent No. 3,352,369, entitled Sonic Method and Apparatus for Driving Anchors, Anchor Posts and the Like.

This invention relates directly to, and its object is to provide for, the sonic driving of inserts, such as studs, pins, stems and the like into bodies of parent material having plastic or plastically deformable and compliant or elastic characteristics, such as those synthetic materials generally referred to collectively as "plastics," concrete, certain of the metals, such as aluminum, wood, etc. Such materials will be referred to hereinafter for the purpose of the present disclosure and claims as plastic, in the broad sense of the expression, and thus inclusive of various materials, usually homogenous, such as the synthetic plastics, metals, etc. Normally, and chiefly in contemplation, are inserts in the nature of fastening elements, though broadly the invention is not so limited.

Most of my prior applications and patents listed above are concerned with sonically vibratory methods and apparatus for penetrating a member into bodies of parent material of plastic, compliant characteristics, such as the earth, or with sonic apparatus usefully adapted in some respect to the carrying out of the present invention. In the earth penetration applications, which have now been extensively studied, the penetration takes place by a sort of fluidizing effect, in which friction is reduced, and the parent granular body becomes somewhat fluidized, and thus flows or deforms to accept intrusion of the penetrating member.

The present invention is directed to a process which to some degree is of the same nature as my earth-penetrating processes, and according to which a stud, pin, stem or nail is inserted into a body of plastic and compliant parent material by application of sonic vibrational energy, and becomes exceedingly tightly bound in the plastic body. The process comprises, in an illustrative form, with choice of a threaded stud as an example, the application of a steady bias force lengthwise on the stud, with one end of the stud engaged against the plastic body into which it is to be inserted, and the additional application to the stud of a cyclic force which is delivered from a sonic, elastically vibratory resonator. The stud acts as a "load" on this resonator, and vibrates substantially bodily, but in the resonant environment of the driving resonator. Sonic energy created within the resonator is thus delivered to and through the stud to the interface between the stud and the plastic and compliant material, causing the latter to part and flow around the stud as the stud is vibrated in engagement with the parent material.

There is, in this performance, a cyclic displacement of the compliant parent material at and around the interface between the stud and the material. The plastic parent material accepts screwthreads on the stud, flows around them, and closes tightly on them when sonic activation is terminated. The stud is then held by elastic force of the surrounding compressed parent material, and a very solid insert is thus provided. It is unessential to predrill holes in the parent body, though in some applications, or with some materials, the predrilling of a hole, on a small diameter in relation to the stud, is not excluded. Such a practice may in fact facilitate the process when introducing a relatively large steel stud for example into a parent body of a material such as aluminum.

In some instances the plastic body has a sort of resonant frequency response, or in other words a frequency at which its amplitude of vibration is maximized in response to a sonic source. More importantly, a sonic excitation which is brought into engagement with the parent material will cause an out-of-phase relative motion at the engagement interface if the excitation is at a different frequency from the above mentioned frequency response of the parent material. The mathematical probability of the acoustic resonator tool of this invention having exactly the same frequency as the frequency response of the parent material is practically nil. In fact the frequency response of the material changes as the stud enters it. Therefore it is important to note that the sonic resonator of this invention is a major contribution to the novel advantages.

Summing up, the sonic energy causes the plastic part to open, flow around, and finally close in on the stud as it is sonically activated and pushed into the part, the intrusion of the stud being accompanied by a cyclic displacement of the plastic medium in a region around the virbatory interface.

The amount of sonic energy generated and applied of course varies with physical characteristics of the parent material, and with the size of the stud. For example, relatively higher sonic energy is required for installing a metal stud in a metal parent material than in a plastic.

A theory of the mechanism by which this observed performance takes place can be proposed at this time; however, I do not bind myself thereby, since the phenomena involved are obscure, and there may presently be certain gaps in theory which will be filled in as a result of subsequent discoveries. This theory is as follows: The vibration of the stud in engagement with the parent material, while held forcibly thereagainst, causes elastic or sonic vibrations to take place in the material, with the material thus undergoing a stress cycle involving extreme tension during a part of the cycle. During the succeeding periodic tensions, the density of the material is materially reduced, the material is stretched, and the vibrating stud forced thereagainst is thereby enabled to part the material and penetrate it, increment by increment. Penetration into a solid wall of parent material thus involves a progressive parting and expansion of the material as the stud forces a hole therein. There is a cyclic displacement of the material at and around the interface, involving cyclic compression and tension half cycles, and consisting, in essence, of sonic waves in the material. Friction of the vibrating stud against the material as it intrudes therein is relatively low by reason of the vibrations. In addition, it has been found that plastic, compliant materials in general tend to fluidize or flow when subjected to properly applied high-intensity sound waves causing random vibrations in the parent material. Such materials in this condition will readily accept an intruder pressed thereagainst. Thus, the parent material, set into such vibration by the intruding stud, parts and flows around the stud, and even around irregularities such as threading thereon. It also appears that at fairly high sonic vibration frequencies, the accelerations are sufficiently high that the parent material is periodically "thrown out" with sufficient force that its elastic restoration forces do not have sufficient time for complete elastic return during the cycle. Thus a sort of dynamic hole is created in the material as the vibratory insert element intrudes into the parent material. When vibration is stopped, the deformed parent material around the stud contracts elastically to bind the stud therein. The parent material may in many cases contract about the stud also by restoration forces owing to elastic hysteresis or "memory-effect."

It is normally advantageous to orient the vibratory action of the insert or stud longitudinally, i.e., along an axis in alignment with the desired direction of penetration. Penetration can also be accomplished, however, by use of lateral or gyratory vibrations, and such vibrations can, in some cases, be superimposed on longitudinal vibrations. Much depends upon the geometry of the insert element, and the type of vibrations used can be readily varied to accommodate various situations.

The system has been found to operate successfully when acting under a prevailing condition of resonance. Preferably, I obtain this condition of resonance by the use of an elastically vibratory resonator including a vibration generator of a special type to be mentioned presently, the resonator having mass and compliance parameters combined in a discrete acoustic circuit so as to be elastically vibratory in a resonant frequency range. In one representative embodiment, the oscillator can comprise a laterally vibratory elastic beam, vibratory in a lateral resonant standing wave mode under the drive of a vibration generator coupled to it in the region of one of its antinodes. Or, a beam or rod vibratory in a longitudinal, or a gyratory, resonant standing wave mode, can be used. The stud or other insert to be driven is coupled to a vibratory portion of the resonator, e.g., to such a beam or rod, and thus becomes a "load" on the resonator. The elastic vibration pattern is set up in the insert, and its vibration is substantially of the bodily type. However, being coupled to and driven by the resonator, it vibrates in the environment of resonance, and its mass actually, in effect, during operation, becomes a part of the over-all resonant vibratory system. Thus, the insert acts as a mass reactive load on the system, and influences the resonant frequency of the system. In addition, owing to the frictional and energy dissipative engagement of the insert with the compliant body which it penetrates, the insert acts as a resistive or energy dissipative load on the system.

In view of the benefits to the performance arising out of resonance, it appears evident that there is a link between the present system and other of my inventions wherein vibratory members are made to penetrate certain deformable, compliant materials, such as the earth, under conditions of resonance. See my prior Patents Nos. 2,972,380 and 2,975,846 on pile driving, and my aforementioned application Ser. No. 441,209, on driving of anchor rods into the earth. In all of these cases, there appears to be, as a result of resonance in the acoustic system, a reactive decoupling between the penetrating member and the compliant body being penetrated. Without such resonance, and such decoupling, a large region of the body being penetrated tends to vibrate more or less in unison (both directionally and synchronously) with the penetrating member, so as to function as a spring whose compliance reactance can counteract the mass reactance of the penetrating member, and thus furnish a type of resonance in which a substantial portion of the body of material being penetrated is a necessary vibratory partner. With resonance as used in the present system, however, the body of material being penetrated remains to a large extent reactively uncoupled from the vibratory insert, and thus does not vibrate "in phase" in a resonant manner, though it obviously does afford both resistive and reactive loading on the resonant system. Thus under the conditions of the invention, elemental portions of the parent material flow and vibrate in random directions, but a large volume of the material does not vibrate more or less as a unitary spring plug. The material being penetrated thereby accommodates itself better to the intruding insert, even though the latter may have irregularities such as screwthreads, fluting, or the like, and in addition, the insert tends to vibrate to a degree relatively to the body of material, rather than in unison therewith, so that penetration is very greatly facilitated. In this performance, there is evidently a substantial mismatch of impedance at the interface between the insert and parent material, and a substantial out-of-phase relative vibration at this interface, which of course then greatly facilitates penetration while the the same time minimizing friction of penetration.

The system of the present invention utilizes preferably, if not essentially, a certain orbital-mass type of vibration generator which can in certain cases contribute critical improvement to the performance. Thus, as the insert progressively penetrates the parent body, there is a progressive change in impedance loading of the resonator, not only in the frictional resistance factor, but in the reactive factor as a growing portion of the parent material is set into vibration by the intruding insert. It has been mentioned that the use of resonance in the system comprised of resonator and generator tends to accomplish a reactive decoupling of the system from the body of parent material, and this is very largely the case insofar as setting the material of the body into any resonant type of performance is concerned. A portion of the body of parent material must nonetheless be vibrated by the insert as the latter intrudes; and this evidently changes the reactive component of the impedance load on the resonator. Such changes then result in change in both resonance vibration frequency and power factor. The orbital-mass type of generator accommodates in a special way any such change in the impedance of the load as the process goes to completion, so as to keep the performance at or near resonance, and with desirable power factor.

The orbital-mass reactive generator may take any of various mechanical forms, of which the simplest is a mass eccentrically mounted on a shaft turning in a bearing, so that the mass generates a centrifugal force which is reactively opposed by the bearing. The bearing is on a support frame, and this support frame, in response to the centrifugal force so generated and applied, exerts a periodic inertial force on whatever may support it or be coupled thereto. Some improved forms of orbital-mass generator or oscillator are disclosed in my Patents Nos. 2,960,314 and 3,217,551. In these patents are disclosed orbital-mass oscillators comprising a cylindrical mass rolling around the inside of a bearing race ring, and a ring-shaped mass spinning on a bearing pin. In some cases, the generator may be driven by an electrical motor such as an induction motor, or, where increased speed responsiveness to load is desired, by a series motor. In others, as in the case of rollers or rings, the drive may be by an air motor, e.g., a jet directed against the roller or ring. Thus, in many cases, a "slip" type drive is used. In all cases, there is an orbiting mass comprised of a weight driven so as to travel around a closed circular path, which path is determined by a bearing forcibly deflecting and thereby constraining the weight to travel in this curved path. The bearing experiences a powerful rotating force reaction caused by the deflected weight swinging around its path, which force can be considered periodic in nature because each point spaced around the orbiting path is periodically subjected to this force. Together with its support frame, the bearing is thus a reactive coupling output device.

Also, in all cases, the bearing has a support frame, as aforesaid, adapted for making the actual coupling to the system to be vibrated. The mass of the bearing and support frame may be very considerable in relation to that of the orbiting mass. The momentum imparted to this considerable mass must be equal to that of the small orbital mass, and since the velocity of the small orbital mass is quite high, the motion of this considerable mass is thus relatively low. I thus have the advantage of a large mass moving periodically with great force or momentum, but through small displacement distance at relatively low velocity. This represents a condition of relatively high impedance (defined hereinafter) in the support frame, i.e., in the generator output coupling element, such as is uniquely suited to the circuit requirements of the present invention.

Such a vibration generator may be arranged and utilized so as to deliver from the generator support frame, or coupling means, a continuously rotating vectorial force. In the more usual case, however, the desired output is an alternating force doing work in reverse directions along a given direction line, and such a force, and other very important advantages to be mentioned, are obtained by incorporating the orbital-mass generator as a component of an elastically vibratory resonator, of the general nature discussed hereinabove. In a preferred embodiment, I use an elongated elastically vibratory resonator bar of fair mass, in which resonant lateral standing wave vibrations can be set up, with the orbital-mass generator coupled to a velocity antinode of this bar. Typically, a full-wavelength lateral standing wave is set up in and along the bar, with velocity antinodes at both ends of the bar and at the center. Thus the orbital-mass generator can be coupled in at either end, or at the center, and when driven in the resonant frequency range for lateral standing wave vibration in the bar, the usual wave pattern for a lateral standing wave is established. The insert to be driven is coupled to a vibratory portion of this bar, and, together with the vibrated portion of the body penetrated by the insert, represents a load on the resonator. At resonance, the mass and compliance reactances of the resonant system, inclusive of the load, are equal and cancel one another, the impedance to vibration of the masses of the system is thereby reduced to friction, or actual work done, and vibration amplitude in the resonator bar is desirably magnified by a large factor. Bearing in mind that the vibration in the bar in this case is laterally of the bar, it can be said that the blocking impedance of the masses along direction lines laterally of the bar have been very greatly reduced, generator output force otherwise consumed by this impedance is diminished, and large vibratory motion laterally of the bar is obtained.

In this resonant performance, the large necessary vibratory masses of the system are "tuned out" and consume none of the output force from the orbital-mass generator. They are moved by elastic restoration forces exerted by the deformed compliances, which are in turn elastically deformed, of course, in decelerating the masses. Thus the massive elastic system vibrates with no consumption of force save for that lost in friction and in doing useful work.

A further considerable advantage in the system is that the masses will then vibrate at substantial amplitude (exhibit large vibrational displacement) and become a powerful acoustic flywheel, storing considerable energy. The masses become an advantage. The system exhibits resonant magnification of motion. This gives a system which can build up to high vibratory power level; and the energy storage flywheel effect also gives the ability to "ride over" irregularities presented by the work load.

From the foregoing it will be appreciated that an orbiting mass, such as one confined to traveling around a circular path, delivers its reaction against this confinement as a reactive centrifugal force which inherently rotates so as to be a force successively in all directions in a plane. On the other hand, as has been shown, the resonating bar, or equivalent, can for example be an elastically vibratory bar. Such resonant motion is thus typically vibration back and forth along a line or path. Since such resonance, however, eliminates the blocking effect of the masses only along this line or path, the vibratory amplitude will be of substantial magnitude only along this same line or path, even though the oscillator is delivering force in an infinite number of directions radiating around the focal center of the mass orbit. The above described natural blocking effect of the masses thus prevents the vibration from being substantial, except in the path direction or directions along which the condition of resonance has eliminated the blocking mass effect as described. The performance of the orbital-mass oscillator, in combination with the resonance exerted thereby, and which I term orboresonance, can thus polarize the resulting vibration from the orbiting mass, and gives stability of vibratory motion along this line of orientation. The vibration stroke can thus be confined along a predetermined path.

Another very important property of the present system is a unique frequency stability. An orbiting mass-oscillator by itself can tend to change its frequency from time to time. However, in the "orboresonance" combination, this orbiting mass is acoustically coupled to a resonant vibratory system, with dimensional proportions adjusted so that the orbiting mass is very conscious, so to speak, of the impedance of the resonant system. Within the resonant frequency range, and especially in the preferred operating region on the low side of the resonance peak, where resonant magnification exhibits sharply increasing amplitude in response to increasing frequency, the orbiting mass oscillator automatically tends to "lock in" and hold to a stable frequency condition. The explanation is as follows: A slight increase in frequency, resulting from any cause, produces an increase in vibration velocity and amplitude. Also, as resonance is approached, the reactive part of the impedance is of course diminished. However, the in-phase or resistive component of the impedance increases. This effect improves the phase angle of the orbital mass, so more work is done. Hence, more drive torque is required of the orbiting mass oscillator, and in turn, more drive effort from its drive source or prime mover. Thus, the vibratory system, operating near resonance, feeds back a demand for additional drive effort. Using a drive source whose drive effort on the oscillator remains constant, or whose output is insufficient to develop the increased drive torque demanded at the increased frequency, or using as a source a prime mover which is inversely speed-responsive to load (e.g., an induction motor, or for greater responsiveness, a series motor), the system responds by actually reducing the drive speed of the oscillator in the face of this increase in demand for drive torque. Thus the initially assumed slight increase in frequency is corrected. The system similarly responds to a slight decrease in frequency by moving further from resonance, and through a process which will now be evident, producing increased speed at the orbiting mass oscillator such as to correct the assumed slight decrease in frequency. The system thus automatically holds a determined frequency. Bearing in mind the impedance equation $F=VZ$, where F is drive force exerted by the oscillator on the vibratory system, and V is the velocity of vibration, an increase in frequency toward the resonance peak thus increases V, and increases Z, by increasing the resistive component thereof sufficiently to overbalance the decrease in the reactive component thereof that occurs as resonance is approached, so that the force F must be increased to sustain the new conditions. Thus the above mentioned demand for increased torque takes place. This increase in torque is not supplied. Therefore, the frequency is automatically reduced in response to the increase which took place. The system thus has inherent frequency stability.

The combined system of an orbital-mass oscillator and resonator has a unique performance which is exhibited in the form of a greater effectiveness and particularly greater persistence in sustained sonic action as the work process goes through successive phases involving changes of working environment during the driving of the insert. The orbiting mass oscillator in this combination is able to sustain its development of power for the load as the sonic energy absorbing environment changes with the variations in sonic energy absorption by the load. It does this by automatically changing its phase angle, and therefore its power factor, with these changes in the resistive impedance of the load.

This can be explained as follows: Consider the orbital-mass generator preferably used in this invention, say of the type involving a roller mass traveling in a circular path around the inside of a cylindrical bearing, and assume this bearing to be fixed to a free end of an elastic bar, the axis of the bearing being perpendicular to the length axis of the bar. Assume further that the roller mass is driven around the bearing at a frequency for a fundamental resonant mode of lateral standing wave vibration, so that the bar is driven my the cyclic output force exerted by the bearing to undergo one full-wavelength standing wave vibration. The end of the bar where the generator is coupled then vibrates elastically, transversely of the length of the bar, at the cyclic frequency of the roller mass. The velocity of the transversely vibrated end of the bar, and also the force exerted by the bearing on the bar, can be plotted as sinusoidal waves. With no net work done on or through the bar, the force wave then lags the velocity wave by 90°. The phase angle of the roller in its race is such that at this time it moves laterally of the bar in step with the generator end of the bar. This is a condition of 90° phase angle, a power factor of zero, and zero net work done. Assume now that the vibrating bar is subjected to substantial friction. The velocity wave loses amplitude, and the roller mass automatically undergoes an angular shift in position within its race so as to bring the sinusoidal force wave more into phase with the velocity wave. The phase angle is thus reduced, and power factor increased the necessary amount for the generator to develop and supply the energy consumption required by the friction now encountered. Correspondingly, if the friction were large to start, and subsequently diminished, the phase angle would be small to start, and would subsequently go towards or to substantially 90° with progressive elimination of friction.

Also, if the "load" on the orbital mass oscillator-resonator combination should vary in mass reactance, or elastic compliance reactance, during operation, the frequency and phase angle of the oscillator will shift to accommodate these changes. A change in reactance can occur in the insert-driving system of the invention; for example, this tends to occur as the insert becomes progessively engaged with and enveloped by the parent material of the body. Such a change in reactance results in a change in impedance, phase angle, and resonance frequency. If the prime mover is one which has "slip," or is speed-responsive to torque, there is a resulting automatic feedback of torque to the prime mover which drives the orbiting mass oscillator such as to re-establish stable operation at a new resonant frequency, and with adjusted phase angle and power factor which automatically accommodate the added reactance and any remaining energy consuming load. Any changes in magnitude of either or both the friction or energy consuming part of the load and the reactive part of the load are thus automatically adjusted for by the so-called "orboresonator," so that the oscillator sustains its development and transmission of power into the load throughout all such changes.

To accomplish these performances the resonant system must be sufficiently large relative to the resistive impedance so as to exhibit resonant magnification. Moreover the orbiting oscillator must have sufficient output force impedance so as to accomplish such resonant magnification, even with the resistive load; and this oscillator output must also be large enough to cause the stabilizing torque load on the oscillator drive. However, the oscillator output and input should not be so high as to cause a power flow which overrides the resonant feedback phenomenon above described. This resonance phenomenon could be undesirably buried if it is simply caught between a very powerful oscillator and a large resistive load.

Before proceeding with the detailed descriptions of illustrative species of the invention, there will be presented a discussion of certain principles of sonics necessary to an understanding of the invention, some of which are generally familiar to those skilled in the art, but a number of which are not.

By the expression "sonic vibration" I mean elastic vibrations, i.e., cyclic elastic deformations, such as longitudinal, lateral, gyratory, torsional, etc., generated in a structure, or which travel through a medium with a characteristic velocity of propagation. If these vibrations travel longitudinally, or create a longitudinal wave pattern in a medium or structure having uniformly distributed constants of elasticity and mass, this is sound wave transmission. Regardless of the vibratory frequency of such sound wave transmission, the same mathematical formulae apply, and the science is called sonics. In addition, there can be elastically vibratory systems wherein the essential features of mass appear as a localized influence or parameter, known as a "lumped constant"; and another such lumped constant can be a localized or concentrated elastically deformable element, affording a local effect referred to variously as elasticity, modulus, modulus of elasticity, stiffness, stiffness modulus, or compliance, which is the reciprocal of the stiffness modulus. Fortunately, these constants, when functioning in an elastically vibratory system such as mine, have cooperating and mutual influencing effects like equivalent factors in alternating-current electrical systems. In fact, in both distributed and lumped constant ssytems, mass is mathematically equivalent to inductance (a coil); elastic compliance is mathematically equivalent to capacitance (a condenser); and friction or other pure energy dissipation is mathematically equivalent to resistance (a resistor).

Because of these equivalents, my elastic vibratory acoustic circuit systems with their mass and stiffness and energy consumption, and their sonic energy transmission properties, can be viewed as equivalent electrical circuits, where the functions can be expressed, considered, changed and quantitatively analyzed by using well proven electrical formulae.

Since sonic or elastic vibration results in the mass and elastic compliance elements of the system taking on these special properties akin to the parameters of inductance and capacitance in alternating current phenomena, wholly new performances can be made to take place in the mechanical arts. The concept of acoustic impedance becomes of paramount importance in understanding performances. Here impedance is the ratio of cyclic force or pressure acting in the medium to resulting cyclic velocity or motion, just like the ratio of voltage to current. In this sonic adaptation impedance is also equal to media density times the speed of propagation of the elastic vibration.

In this invention impedance is important to the accomplishment of desired ends, such as where there is an interface. A sonic vibration transmitted across an interface between two media or two structures can experience some reflection, depending upon differences of impedance. This can cause large relative motion, if desired, at the interface.

Impedance is also important to consider if optimized energization of a system is desired. If the impedances are adjusted to be matched somewhat, energy transmission is made very effective.

Sonic energy at fairly high frequency can have energy effects on molecular or crystalline systems. Also, these fairly high frequencies can result in very high periodic acceleration values, typically of the order of hundreds or thousands of times the acceleration of gravity. This is because mathematically acceleration varies with the square of frequency. Accordingly, by taking advantage of this square function, I can accomplish very high forces with my sonic systems. My sonic systems perferably accomplish such high forces, and high total energy, by using a type of orbiting mass sonic vibration generator taught in my Patent No. 2,960,314, which is a simple mechanical device. The use of this type of sonic vibration generator in the sonic system of the present invention affords an especially simple, reliable, and commercially feasible system.

An additional important feature of these sonic circuits is the fact that they can be made very active, so as to handle substantial power, by providing a high "Q" factor. Here this factor Q is the ratio of energy stored to energy dissipated per cycle. In other words, with a high Q factor, the sonic system can store a high level of sonic energy, to which a constant input and output of energy is respectively added and subtracted. Circuitwise, this Q factor is numerically the ratio of inductive reactance to resistance. Moreover, a high Q system is dynamically active, giving considerable cyclic motion where such motion is needed.

Certain definitions should now be given:

Impedance, in an elastically vibratory system, is mathematically, the complex quotient of applied alternating force and linear velocity. It is analogous to electrical impedance. The concise mathematical expression for this impedance is $$z = R + \sqrt{-1}\left(2\pi fM - \frac{1}{2\pi fC}\right)$$

where M is vibratory mass, C is elastic compliance (the reciprocal of stiffness, or of modulus of elasticity) and $f$ is the vibration frequency.

Resistance is the "real" part R of the impedance, and represents energy dissipation, as by friction.

Reactance is the "imaginary" part of the impedance, and is the difference of mass reactance and compliance reactance.

Mass reactance is the positive imaginary part of the impedance, given by $2\pi fM$. It is analogous to electrical inductive reactance, just as mass is analogous to inductance.

Elastic compliance reactance is the negative imaginary part of impedance, given by $1/2\pi fC$. Elastic compliance reactance is analogous to electrical capacitative reactance, just as compliance is analogous to capacitance.

Resonance in the vibratory circuit is obtained at the operating frequency at which the reactance (the algebraic sum of mass and compliance reactances) becomes zero. Vibration amplitude is limited under this condition to resistance alone, and is maximized. The inertia of the mass elements necessary to be vibrated does not under this condition consume any of the driving force.

A valuable feature of my sonic circuit is the provision of enough extra elastic compliance reactance so that the mass or inertia of various necessary bodies in the system does not cause the system to depart so far from resonance that a large proportion of the driving force is consumed and wasted in vibrating this mass. For example, a mechanical oscillator or vibration generator of the type normally used in my inventions always has a body, or carrying structure, for containing the cyclic force generating means. This supporting structure, even when minimal, still has mass, or inertia. This inertia could be a force-wasing detriment, acting as a blocking impedance using up part of the periodic force output just to accelerate and decelerate this supporting structure. However, by use of elastically vibratory structure in the system, the effect of this mass, or the mass reactance resulting therefrom is counteracted at the frequency for resonance; and when a resonant acoustic circuit is thus used, with adequate capacitance (elatsic compliance reactance), these blocking impedances are tuned out of existence, at resonance, and the periodic force generating means can thus deliver its full impulse to the "work," which is the resistive component of the impedance.

Sometimes it is especially beneficial to couple the sonic oscillator at a low-impedance (high-velocity vibration) region, for optimum power input, and then have high impedance (high-force vibration) at the work point. The sonic circuit is then functioning additionally as a transformer, or acoustic lever, to optimize the effectiveness of both the oscillator region and the work delivering region.

For very high impedance systems having high Q at high frequency, I sometimes prefer that the resonant elastic system be a bar of solid material such as steel. For lower frequency or lower impedance, especially where large amplitude vibration is desired, I use a fluid resonator. One desirable specie of my invention employs, as the source of sonic power, a sonic resonant system comprising an elastic member in combination with an orbiting mass oscillator or vibration generator, as above mentioned. This combination has many unique and desirable features. For example, this orbiting mass oscillator has the ability to adjust its input power and phase to the resonant system so as to accommodate changes in the work load, including changes in either or both the reactive impedance and the resistive impedance, as has been mentioned above. This is a very desirable feature in that the oscillator "hangs on" to the load even as the load changes.

It is important to note that this unique advantage of the orbiting mass oscillator accrues from the combination thereof with the acoustic resonant circuit, so as to comprise a complete acoustic system. In other words, the orbiting mass oscillator is matched up to and included in, the resonant part of its system, and the combined resonator system is matched up to the acoustic load, or the job to be accomplished. One manifestation of this proper matching is a characteristic whereby the orbiting mass oscillator tends to "lock in" to the resonant frequency of the resonant part of the system.

The combined system has a unique performance which is exhibited in the form of a greater effectiveness and particularly greater persistence in a sustained sonic action as the work process proceeds or goes through phases and changes of conditions. The orbiting mass oscillator, in this matched-up arrangement, is able to hang on to the load and continue to develop power as the sonic energy absorbing environment changes with the variations in sonic energy absorption by the load. The orbiting mass oscillator automatically changes its phase angle, and therefore its power factor, with these changes in the resistive impedance of the load.

A further important characteristic which tends to make the orbiting mass oscillator hang on to the load and continue the development of effective power, is that it also accommodates for changes in the reactive impedance of the acoustic environment while the work process continues. For example, if the load tends to add either inductance or capacitance to the sonic system, then the orbiting mass oscillator will accommodate accordingly. Very often this is accommodated by an automatic shift in frequency of operation of the orbiting mass oscillator by virtue of an automatic feedback of torque to the energy source which drives the orbiting mass oscillator. In other words, if the reactive impedance of the load changes this automatically causes a shift in the resonant response of the resonant circuit portion of the complete sonic system. This in turns causes a shift in the frequency of the orbiting mass oscillator for a given torque load provided by the power source which drives the orbiting mass oscillator.

All of the above mentioned characteristics of the orbiting mass oscillator are provided to a unique degree by this oscillator in combination in the resonant circuit. As explained elsewhere in this discussion the kinds of acoustic environment presented to the sonic source by this invention are uniquely accommodated by the combination of the orbiting mass oscillator and the resonant system. As will be noted, this invention involves the application of sonic power which brings forth some special problems unique to this invention, which problems are primarily a matter of delivering effective sonic energy to the particular work process involved in this invention. The work process, as explained elsewhere herein, presents a special combination of resistive and reactive impedances. These circuit values must be properly met in order that the invention be practiced effectively.

Reference is next directed to the accompanying drawings, showing a number of illustrative embodiments of the invention and wherein:

FIG. 1 is a diagram of an acoustic circuit in accordance with the invention, coupled up to the insert to be driven into the plastic body;

FIG. 2 is a side elevational view, with parts broken away to show underlying parts in section, of one typical and presently preferred embodiment of the invention;

FIG. 3 is a view taken in accordance with line 3—3 of FIG. 2;

FIG. 4 is a detailed section taken on line 4—4 of FIG. 2;

FIG. 5 is a detailed section taken on line 5—5 of FIG. 2;

FIG. 6 is a fragmentary view of a portion of the apparatus of FIG. 2, but incorporating a modified form of vibration generator;

FIG. 6a is a detailed section taken on line 6a—6a of FIG. 6;

FIG. 7 is a largely diagrammatic view, in vertical section, illustrating a sonic pipe driving system in accordance with the broad scope of the invention;

FIG. 8 is a section taken on line 8—8 of FIG. 7;

FIG. 9 is a view similar to a portion of FIG. 7, but showing improvements in accordance with the invention; and FIG. 10 is an enlarged detail of a portion of the apparatus of FIG. 9 encircled by the arrow 10.

With reference first to FIG. 1, showing schematically the basic system of the invention, numeral 10 designates an elastically vibratory resonator, including an elastic wave or vibration generator 11 sonically coupled thereto, these elements comprising a discrete acoustic circuit operable unloaded or loaded in a resonant frequency range. An elastically vibratory portion of the resonator has an acoustic coupling 12 to an insert 13, such as a stud or the like, and the latter is represented as having been driven into a body 14 of a plastic, compliant material, resting on a support 15. Insert 13 is generally short enough to be vibrated bodily by resonator 10. A prime mover or power source P is operable to drive generator 11 at the resonant frequency of the resonator when unloaded, or when loaded by the insert (thus both prior to and during penetration of the insert into the body 14). The resonant frequency may thus shift during operation. The power source P is preferably a slip-driven device, or one inversely speed-responsive to load, such as an induction or series electric motor, or a stream of fluid driving a rotor. The power source P is also peferably adjusted, as mentioned hereinabove, so as actually to drive the resonator at a frequency just under that for the peak of resonance, thereby gaining the frequency stabilizing benefits explained elsewhere herein.

The generator 11, generating elastic vibration energy, causes the resonator 10 to vibrate elastically at a resonant frequency, these components comprising, as mentioned above, a discrete acoustic resonant circuit. In operation, this acoustic resonant circuit is loaded, as also mentioned earlier, by the insert 13 coupled to the resonator as represented at 12, and the elastic vibratory energy is transmitted to and through the stud to the interface with material to be intruded. This insert, as well as the material of the body 14 into which the insert is to intrude, becomes a load on the oscillator, with both frictional or resistive and reactive components. The reactive component modifies to an extent the resonant frequency of the overall system, and the preferred type of generator mentioned above, namely the orbital-mass type, accommodates itself automatically to the load, driving the overall system at the overall resonant frequency. Moreover, as also mentioned earlier, the loading of the resonator by the insert varies during the driving of the insert, and the orbital mass generator accommodates itself also, and again automatically, to this shift in resonant frequency during the work process. The orbital-mass resonator also sustains its development of power for the load as the character of the load changes by automatically changing its phase angle, and therefore its power factor, with changes in the resistive impedance of the load, as described hereinabove. Operation in the region of resonance has the important effect mentioned above that the vibratory masses of the system are substantially cancelled out as regards their force-consuming effect by the compliances of the system, and maximum vibratory activity is thus attained. The resonant performance as described also has the effect, also mentioned earlier, that the insert is to a substantial extent reactively decoupled from the plastic body 14. As described earlier, when a member is bodily vibrated against a compliant body under conditions characterized by an external system which is nonresonant (so that the member and external system are not in a resonant environment), the plastic body then tends to supply the amount of elastic compliance necessary to balance the bodily vibratory member, and so present a form of "bouncing" resonance, which has some effect as regards improvement of the vibratory amplitude of the member. However, the overall effect of this phenomenon is undesirable, in that a relatively large extent of the plastic or complaint body thereby comes into a unitary type of vibration, i.e. with all elements thereof tending to move directionally in unison. This phenomenon appears to occur automatically and spontaneously. On the contrary, when the member vibrated against the compliant body is a part of an external resonant system, there appears to be no demand made upon the compliant material to supply a large compliance reactance, so as to approach some form of resonant vibration. Under these circumstances, a much smaller amount of the compliant material is set into unitary vibration, with elemental portions of the compliant material vibrating in a random manner, leading to displacement and flow in whatever directions are required to permit easy entry or intrusion of the member being vibrated thereagainst. The phenomena involved here are obscure as regards theoretical explanation, but observation leads to the belief that they occur as described.

The invention will now further be described by reference to FIGS. 2–4, showing an illustrative equipment carrying out the basic system represented in FIG. 1. A hydraulic press frame is designated generally at 30, and is shown to comprise a pair of vertical legs or columns 31 rising from a suitable base at B and having at the top an arch 32 extending therebetween. A hydraulic ram 34 projects downwardly from a cylinder 35 formed integrally with arch 32, and it will be understood that conventional hydraulic arrangements are provided by which the ram 34 can be extended under controlled hydraulic pressure, and subsequently retracted, these parts being omitted from the drawings for simplicity in view of their conventional nature.

On base B there is a horizontal table or platen 36, and there is shown resting thereon, for typical example, a body 38 of a plastic or compliant material, into which a threaded stud 39 is to be inserted. The body 38 may be accurately located by any conventional means, represented here by positioning pins 40.

Disposed in the space between columns 31, and located over the position of the insert 39 to be driven, is a horizontally disposed elastically vibrator, "sonic" beam or bar 50, composed of a good elastic material such as steel. This beam is set into a lateral mode of elastic resonant standing wave vibration, in a vertical plane, and the vibration from this beam is transmitted to the insert by a coupling means 54 connected in this case, as by a pin 55, to the approximate center point of the beam. This coupling means 54 has in its bottom a socket 56 adapted to receive the upper end portion of the insert 39, and the insert 39 may be locked therein by any suitable coupling device, represented in this instance more or less diagrammatically, by a simple set screw 57. Normally, or in ordinary cases, the insert 13 is short relative to a quarter-wavelength of a longitudinal sound wave in the material of the insert at the resonant operating frequency of the system, so that the longitudinal vibration of the insert is essentially of a bodily nature.

The vibration set up in the sonic resonator beam 50 is in the nature of a lateral resonant standing wave, such as diagrammed at $w$ in FIG. 2. In this diagram, the vertical dimension $a$ taken at different positions along the wave pattern shown represents the amplitude of vibration at corresponding points of the beam. Thus, the beam vibrates with minimized amplitude at the two nodal points N, and vibrates at large amplitude at the antinodal regions V at the two ends of the beam as well as at the antinodal region V' at the center. As will be seen, the coupling means 54 has in this instance been connected to the beam 50 in the region of the antinode V', where the wave or vibration amplitude in the beam is at a maximum, so that large vibration will be transmitted directly to the insert. On the other hand, if smaller vibration amplitude is desired, as may be the case in many situations, the coupling means 54 can of course be coupled to any point along the beam where the amplitude of vibration will be of the magnitude desired. In general, the closer the point of coupling to a node N, the less will be the vibration amplitude, but the greater will be the force applied to the insert.

The described lateral standing wave may be set up in the beam by various means, but simple and presently preferred orbital-mass generator means will be described presently.

The nodal points N are at or a little less than approximately one-quarter of the length of the beam inward from each of the two ends thereof, and these are desirable points of minimized vibration for mounting the beam and supporting it during its standing wave vibration. To accomplish such mounting, I locate nodal support pins 60 transversely through the beam at the two nodal points, and these are supported by pairs of ears 61 straddling the bar or beam 50 and depending from opposite sides of a support or support plate 62 located immediately over the vibratory beam 50. The support 62 also has the function of substantially isolating the vibration in the beam 50 from the frame of the machine, in view of the nodal point location of the support pins 60. The support 62 is supported by means of vertical pins 66 threaded therein and extending upwardly through vertical bores in brackets 68 secured to the frame columns 31. The pins 66 fit the bracket bores for free-sliding vertical movement, and have heads 69 on their upper ends, with coil compression springs 70 encircling them between said heads 69 and the upper ends of the brackets 68. Springs 70 are heavy and stiff enough to support the support 62 and the vibratory beam in an uppermost position with support 62 in engagement with the undersides of the brackets 68, until the support 62 is moved downwardly by action of the hydraulic ram 34. Support 62 will be seen to have in its upper side a seat 72 for the ram 34, and the ram is adapted to move downwardly into said seat and then to move the support 62, the vibratory beam 50, and the coupling member 54 in a downward direction. The insert or stud 39 is thus engaged with the upper surface of the plastic or other body 38. The hydraulic ram 34 is then moved further downwardly, thus acting through the support 62, the beam 50 and the coupling member 54 to exert a unidirectional downward force on the insert, so that this force is then in turn exerted by the insert against the body 38 of plastic material. It will be understood that the hydraulic ram is provided with sufficient stroke to accomplish a penetration of the insert 39 as deeply as desired into the body 38, in the manner to be further described hereinafter.

The vibration generator for setting up the lateral standing wave vibration pattern $w$ in the sonic beam 50 is preferably, as stated hereinabove, of the orbital-mass type, and as also heretofore intimated, these may be of several types. In the example indicated in FIGS. 2 and 3, an orbital-mass type of vibration generator has been used of a type such as disclosed in my aforementioned Patent No. 3,217,551, and comprises an orbital-mass vibrator unit 80 mounted in one end portion of the sonic beam 50 and having an electric or air drive motor 82 mounted on a bracket 83 secured to the adjacent column 31. The drive shaft of the motor 82 extends through the coaxial tubular housing 84 into the orbital-mass generator 80, and drives an orbital cylindrical mass, not shown, around the inside of a cylindrical bearing or raceway, of somewhat greater diameter, contained in the generator, the longitudinal axis of this raceway being understood to be coaxial with that of the drive motor 82. The details of such a generator are fully disclosed in my aforesaid Patent No. 3,217,551, and reference thereto can be had for a full understanding. Suffice it to say herein that the operation of the motor driven generator is such as to exert on the end portion of the beam 50 a rotationg force vector which turns about a transverse axis A–A'. This rotating force vector will be seen to have one alternating force component oriented longitudinally of the beam and the other oriented to be vertical, or laterally of the beam.

The rotating force vector is generated at a frequency corresponding to a resonant frequency of the beam 50 for a one-wavelength lateral mode of resonant standing wave vibration, such as diagrammed at $w$, and for this purpose I preferably employ for the power source what has heretofore been described as a slip-driven prime mover or motor 82. This may be an air-driven motor, or an electric motor, such as an induction motor, which inherently has slip, or a series-wound motor. All these motors have the common characteristic of a certain inverse speed-responsiveness to load, such that the speed of rotation, and hence the rotating force vector generated and applied to the end of the sonic beam, tends to decrease in frequency with increase in load. The series electric motor has this characteristic to a marked degree.

It will be understood from principles familiar in the science of acoustics that a standing wave such as diagrammed at $w$ results from transmission or propagation along the beam 50 from the generator or oscillator 80 at one end thereof of successive waves of transversely oriented elastic deformation vibrations, which waves are reflected from the far end of the beam, and through interference with succeeding forwardly propagated waves, establish a lateral standing wave with nodes and antinodes as represented and described. The free end of the beam, where a velocity antinode can be developed, is a good point, of proper impedance, for approximate location of the vibration generator. The quarter-wavelength points, which are points of very high impedance, with minimized vibration amplitude, are appropriate points for mounting of the beam.

The prime mover or motor 82, whether air-driven, or an electric motor such as an induction or series-wound motor, and the sonic vibratory beam 50 must be so correlated in design and operation that the vibration generator will operate in the resonance frequency range of the beam 50, from no load to the fully loaded condition of the latter, and both preferably and importantly, the design and correlation, including the power of the prime mover, should be such that the vibration frequency of the beam is held on the low side of that for peak resonance. The behavior of the system in this regard has been fully described in the introductory part of the specification, and need not be repeated here, excepting to recall that the arrangement described stabilizes the frequency at which the system operates through the working cycle of the process, i.e. notwithstanding impedance changes in the load on the resonator. Further considering the working cycle of the system, prior to engagement of the stud 39 with the block 38 to be penetrated, there is almost no resistive (frictional) load on the resonator of the system, the stud 39 acting as a small mass or inductive reactive load. Then when, as a consequence of lowering of the beam by the ram, the vibrating stud is engaged with and forced down on the plastic and compliant body 38, so that it is subject to both a periodic and a continuous downward bias force superimposed on one another, there is some addition of both compliance and mass reactances to the load on the system, and depending upon the differences of these in any given case, the load becomes either more mass-reactive or more compliance-reactive, and thus there is an accompanying shift in resonance frequency and in power factor in the operation of the resonator and its vibration generator, as heretofore explained. Thereafter, as the beam 50 is further lowered, with the same applications of bias force and periodic force cycle to the stud, the stud progressively intrudes into the plastic substance of the body to be penetrated, and the elements of this substance, vibrating randomly, move so as to open up, and to flow around and envelop the intruder, as heretofore described. In this action the resistive component of the load impedance becomes of substantially greater magnitude, and, because portions of the material are vibrated, there are progressive changes in reactive impedance. The orbital-mass vibration generator automatically compensates for these environmental changes which affect the load on the generator, and maintain an operating condition which assures rapid completion of the installation process.

When the insert is fully installed, the vibration of the beam 50 is terminated, the coupling disengaged from the stud, and the ram elevated, permitting springs 70 to return the apparatus to the starting position. The plastic material into which the insert has been installed has then closed elastically on the insert, binding it tightly in position.

FIGS. 6 and 6a show a modification of the embodiment of FIGS. 2–5, according to which a simple form of air-driven vibration generator is used. This air-driven generator is of the orbital-mass type mentioned hereinabove. A sonic beam similar to the beam 50 of the earlier embodiment is used, and is fragmentarily indicated at 90, with one end hollowed out, as indicated at 91. The beam will be understood to have two nodal point mounting members 92, and thus to have a velocity antinode region at the illustrated hollowed-out end. A horizontal transverse sleeve 94 is mounted in the beam end across the hollow or cavity 91. This sleeve 94, which is thus parallel to the nodal mounting pins 92, is set tightly into the beam wall 97 at one side of the cavity 91, and is screwed into the beam wall 98 on the opposite side, as shown in FIG. 6a. One end of the sleeve 94 is closed, as illustrated, and the other is threaded to receive an air intake pipe 99. Surrounding the sleeve 94 is an inertia ring 100 having an inside diameter somewhat larger than the outside diameter of the sleeve 94, and of approximately the proportions shown in FIG. 6. The sleeve 94 is provided with tangentially oriented air discharge jets 102 extending from its inner bore to its exterior periphery. Air under pressure delivered via air intake pipe and entering the bore of sleeve 94 is ejected with tangential components of direction toward the inertia ring 100, driving the ring so as to spin or whirl on the sleeve 94, in direction of the arrow, as indicated in FIG. 6. To confine the ring 100 laterally on the sleeve 94, so as to remain in proper relationship to the air jets, and to guide it against lateral displacement or wobble, the sleeve 94 is formed with peripheral beads 95 positioned closely adjacent opposite ends of the ring 100. It will be evident that the inertia ring exerts a gyratory force on the sleeve 94, with the resulting rotating force vector turning about the axis of the sleeve 94, and being applied to said sleeve to the extremity of the beam. The rotating force vector is generated at the proper resonant frequency, just below that for peak resonance of the beam 90, by air under pressure delivered via pipe 99, and controlled by suitable control means to deliver the drive effort required, as explained hereinabove.

Reference is next directed to FIGS. 7 and 8, showing a system within the broad scope of the invention for vibratory driving of an insert member, in this instance a length of pipe, into a plastic and compliant body which in this instance consists of the earth. The earth material in this case becomes an impedance load on a resonant elastically vibratory driving system, and the earth material, under the influence of the vibrated pipe, becomes sonically "fluidized," in such a way as to accommodate the intrusion of the pipe. Though not identically equivalent in each and every respect, there are certain identities and analogies between this pipe driving system and my system for driving inserts into plastic, compliant bodies, such that the latter should be treated broadly as having features that are equivalent to the forms, and more limitedly, as an extension of the former, with changes adapting it more especially to a novel environment.

In FIGS. 7 and 8, numeral 110 designates generally an earth supported building structure, and numeral 111 the underlying earth, which has been formed with an exposed bank 112 to one side of the building structure, and which has a somewhat irregular surface area 113 beyond bank 112, and at a level some feet below the foundation structure of the building.

At 114 is indicated a pipe or conduit composed of steel, wrought iron, fiber glass, or other suitable elastic material, which is in course of being driven horizontally into bank 112 and under the building structure for any of a number of possible purposes, such as to provide a service water connection, a drain pipe, electric wire conduit, or to perform any of this function. The rearward end of this pipe or conduit 114 is received in a coupling collar 115, and may be clamped therein as by clamp screw indicated at 116. The forward end of the pipe may be capped.

The pipe coupling collar 115 projects from and is fastened to the front of the housing 118 of a vibration generator generally designated by the reference character G', and which contains means for imparting to the housing, and thence to the pipe 114 clamped within the coupling collar 115, a vibratory motion in a direction longitudinally of the pipe 114. The body or housing 118 comprises, in brief, a means for exerting an alternating force against the end portion of the pipe 114 in a direction longitudinally thereof, and is of course of substantial impulse, capable of generating compressional (sonic) waves which travel down the pipe 114 with the speed of sound (16,000 feet per second in the case of steel). The frequency of the vibration is made sufficient that a standing wave is developed in the pipe, and may typically be in the approximate range of say from something over 100 c.p.s. to around 400 c.p.s., or even lower or greater than that range for certain cases, depending upon the length of the pipe and the speed of sound therein. The frequency is preferably adjusted to resonance for the length of the pipe by appropriate regulation of the driving means for the vibration generator, all as will be discussed in more particular hereinafter.

Extending rearward from generator housing 118, and coupled thereto, for example as diagrammatically indicated at 120, is a short shaft 121 carrying a piston 122 which works in an air cylinder 123, the latter having an axial sleeve 123a which slidably fits the shaft 121. The cylinder space 124 on the near side of the piston may be vented to atmosphere, as indicated at 125; and the cylinder space 126 on the far side of the piston is supplied with air under compression, via a hose 127 connected to a suitable source of supply, not shown, so that a body of compressed air is maintained in chamber 126 to furnish air spring action. This air spring functions as a vibration isolator I.

Extending rearwardly from the head end of cylinder 123 is a shaft 130 having a ball-and socket coupling at 131 with a long screwthreaded shaft, or lead screw, designated by the numeral 133. This lead screw 133 has a cross-bar 134 by which it may be manually rotated, and it passes through a nut member 135, understood to contain internal screwthreads meshing with those of the shaft 133, and which is firmly anchored to a substantial vibration attenuating mass, preferably the earth itself. Typical earth anchorage means are shown in the drawings, including a pair of legs 136 pivotally connected to nut 135 as at 137 and formed at their extremities with earth-engaging feet or flanges 138. There is also illustrated an additional anchorage means, a "dead man" 139 buried in the earth and connected by rods 140 and 141 and a turnbuckle 142 to the body of nut 135. By this means a very firm anchorage is made to the earth, and the earth functions as a mass which has a vibration attenuative effect on the system, and holds the air cylinder 123 against vibration of material amplitude.

Returning now to a consideration of the vibration generator, an orbital-mass type is shown such as disclosed in my Patent No. 3,217,551. Other types of vibration generators are capable of use in the invention, but that shown herein, and in a more refined form in said Patent No. 3,217,551 is presently preferred.

Generator housing 118 comprises an intermediate body member or block 145, and two end plates 146 and 147, end plate 146 being removed to expose underlying members in FIG. 8. Block 145 has two raceway bores 148, one over the other, and each contains an inertia rotor 150. Each such rotor 150 embodies an inertia roller 151, of somewhat less diameter than the corresponding raceway bore 148, and which is rotatably mounted on an axle 152 projecting axially from the hub portion of a spur gear 154, whose pitch circle is substantially of the same diameter as roller 151. Gear 154 meshes with an internal gear 155 formed or mounted within housing body 145 concentrically with the corresponding raceway bore, and whose pitch circle is substantially of the same diameter as said bore.

Each rotor 150 is designed to turn in an orbital path about its raceway 148, with gear 154 in mesh with ring gear 155, and with inertia roller 151 rolling on the bearing surface afforded by the bore 148. To maintain the roller 151 in proper engagement with the raceway 148 while the generator is at rest, or coming up to speed, the axle 152 of the rotor is provided with an axial pin 156 which rides around the raceway bore 148.

Generator housing 118 is here shown as mounted on a horizontal base plate 160, between guides 161, and it is to be understood that the generator housing is capable of limited vibratory movement on base plate 160 between these guides 161, in a direction perpendicular to the plane of the paper as viewed in the aspect of FIG. 8. Cylinder 123 is also mounted on base plate 160, as by means of support 160a. The base plate 160 is located on a horizontal platform 162, suitably blocked up on the earth, so as to provide a level surface on which the base plate 160 and parts supported thereon can move toward the earth bank 112 as the pipe is driven into the ground.

The two rotors 150 are driven through a pair of drive shafts 164, each of which has a universal joint coupling 165 to the corresponding spur gear 154. The lower of the two shafts 164 is connected through a universal joint 166 to the extremity of a shaft 167 mounted coaxially with the lowermost raceway bore 148, and driven from a suitable drive means 168. The drive means 168 should be one capable of variable speed, or speed regulation. It may typically be a series-wound motor, or may be a conventional motor-driven variable-speed drive means. Shaft 167 extends through a gear housing 170, and has mounted thereon, inside said housing, a spur gear 171, which meshes with a spur gear 172 on a shaft 173. Shaft 173 is coaxial with the upper raceway bore 148 and has a universal joint coupling 174 with the uppermost of the two generator drive shafts 164. Gear housing 170, as well as motor 168, are fastened down to the common base plate 160 that supports the generator housing 118, it being recalled, however, that the generator housing 118 is capable of vibratory movement relative to base plate 160, while the gear housing 170 and motor 168 are preferably firmly secured thereto.

The operation of the vibration generator is as follows: Rotation of shafts 164, which turn in opposite directions, rotates the two spur gears 154 around the internal gears 155, the two shafts 164 each moving in a conical gyratory fashion. The inertia rollers 151 roll on the bearing surfaces 148, so that the rotors 150 move in orbital paths around the raceway 148. The centrifugal force developed by the rotors moving in these orbital paths is taken by pressure of the rollers 151 on the surfaces of the raceways 148. The rollers 151 turn at nearly the same rate of rotation as the gears 154, but with some slight variation or creep therebetween, which is accommodated by the rotatable mounting of the rollers 151 on the gear shafts 152. The two inertia rotors 150 thus exert gyratory forces on the housing body 145. The rotors 150, however, are phased so that the vertical components of their motions will be always equal and opposed, while the horizontal components thereof will be in phase or in step with one another. This is accomplished in the original setting of the rotors by means of the interconnecting gearing. For example, as shown, the two rotors may be set so that one is at its extreme uppermost position while the other is at its extreme lowermost position. Accordingly, the rotors move up and down with equal and opposed movements, and the vertical components of the reactive forces exerted thereby on the housing body 145 are equal and opposed and cancelled within the housing. On the other hand, the gyrating rotors move horizontally in step with one another, so that the horizontal components of their reactive forces exerted against the housing 118 are equal and in phase, and the reactive forces experienced by the housing 145 are therefore additive. The housing 118 therefore exerts an alternating force along a direction line perpendicular to the paper in FIG. 8, and in longitudinal alignment with the pipe in FIG. 7.

The apparatus is set up typically as represented in FIG. 7, which shows a stage after the pipe has been driven some feet into the earth. At the beginning, the apparatus will be understood to have been set somewhat further back from bank 112, with the end of the conduit 114 in engagement therewith, and with the handle end of lead screw 133 not far from nut 135. Compressed air is supplied to air spring chamber 126, and handle bar 134 rotated to advance lead screw 133 towards the bank, and to a point such that piston 122 is supported by the lead screw in an intermediate position in cylinder 123, as illustrated.

The compressed air in the air cylinder acts against the piston 122, and thereby a biasing force is transmitted from said piston through rod 121 to the generator housing and from the latter to the corresponding end of pipe 114, so that the opposite end of the pipe is forced against the bank. The vibration generator G' is then driven by motor means 168, so as to deliver a vibratory or alternating output force from the generator housing against the adjacent end of pipe 114. Pipe 114 is thereby set into vibration, and the combination of this pipe vibration and the bias force exerted against the pipe through the air cylinder causes the pipe to penetrate the earth.

It will be seen that the vibration generator G', pipe 114, rod 121 and piston 122 are permitted freedom for vibration while, owing to the vibration isolation action of the air spring constituted by the air cylinder and piston, very little of this vibration is transmitted back through rod 130 and lead screw 133 to the surrounding environment. This vibration isolation attainment is contributed to by high-impedance mass effect of the earth body to which the lead screw is anchored, and which presents a large vibration attenuative factor.

For most effective action, the drive means for the vibration generator is adjusted in speed to produce longitudinal standing wave resonance in the pipe being driven. For example, assume a 40-foot length of steel pipe, and a velocity of sound of 16,000 feet per second therein. Ignoring lumped constant effects of the generator mass and the compliance of the air spring, the frequency for full-wavelength standing wave resonance would be 16,000/40, or 400 cycles per second. The system might alternatively be operated for half-wavelength standing wave resonance, at 200 cycles per second. Actually, because of lumped constant effects of the generator and air spring in either the full-wavelength or half-wavelength case, resonance will be obtained at somewhat lower frequency than just indicated. FIG. 7 represents a possible full-wavelength type of standing wave pattern, with lumped constants of the generator and air spring taken into account. A fully developed velocity antinode (region of maximized velocity oscillation) appears at V, where the end of the pipe engages the ground. A quarter-wavelength distance in back of the antinode V is a node N, and at successive quarter-wave distances in back of node N are a velocity antinode V' and a node N'. Because of lumped constant effects of the generator G' and air spring, the distance from node N' to the air spring piston is less than a quarter-wavelength as indicated. Such a wave pattern results in a large earth fluidizing effect at the end of the pipe, and an excellent rate of penetration.

The wave pattern as described is substantially a full-wave-length pattern. If the pipe length to be driven is relatively short, or it is desired to use a vibration generator of less frequency capability, a half-wavelength type pattern can be employed requiring only half the frequency of the full-wavelength pattern. The drive means for the vibration generator is of course provided with any suitable or conventional means for varying the drive speed of the generator to attain a desired pattern of standing wave resonance.

One particular novel feature of the invention is the application of the reaction bias force, which holds the conduit acoustically coupled in its hole, back against a vibration attenuative mass, which may advantageously be a part of the same earth mass through a part of which the conduit is being inserted.

Reference is next directed to FIGS. 9 and 10, showing a modification of the system of FIGS. 7 and 8. In this case I employ a vibration generator G", which may, at least for illustrative purposes, be identical to the generator G' of FIGS. 7 and 8. The generator G" is backed up by shaft 121a and piston 122a in the air-cylinder type vibration isolator represented generally by the character Ia. The vibration isolator Ia is mounted and backed up by reaction receiving and anchorage devices such as illustrated in FIG. 7, and whose description need not be repeated in connection with FIG. 9.

The generator has a coupling collar 115a, which in this case does not directly receive the pipe to be driven, but instead, receives and is coupled to an elastic resonator rod or bar 175, composed preferably of a good grade of fatigue resistant steel. The forward extremity of the rod 175 is shouldered, as at 176, and the reduced end portion 177 of the rod then is receivable inside the rearward end portion of the pipe 178 which is to be driven into the earth.

It will be clear that there will be a very large mismatch of impedance between the solid rod 175 and the pipe 178 to be driven, meaning that elastic compressional waves (sound waves) transmitted along the rod 175 as a result of a reception of periodic force impulses from the generator G" will be reflected from the forward extremity of the rod 175, and by having the rod 175 of proper length for the vibration frequency generated by the generator G", a longitudinal resonant standing wave pattern, equivalently of half-wavelength, will be set up in the resonator comprised of the rod 175, the generator G", and the shaft 121a back to the isolator piston, as diagrammed at small *sl* in FIG. 9. The vibratory system in which this standing wave is established will be understood to comprise a discrete acoustic circuit operable at a resonant frequency, basically just as represented in FIG. 1, and again, equivalently, in FIGS. 2–5. In this performance, however, there are some differences, such as that a longitudinal wave pattern is employed in the resonator of FIG. 9, as distinguished from the lateral wave pattern used in the vibratory resonator beam in FIGS. 2–5, and such as, further, in that the system of FIG. 9 includes a compliance at the air isolator spring device Ia, whose compliance reactance counterbalances a large part of the mass reactance of a generator G". Thus, in the operation of the system of FIGS. 9 and 10, longitudinal elastic standing wave vibration takes place in the system inclusive of the rod 175, and, in accordance with theory set forth in the introductory part of the specification, the vibration frequency is in the range of resonance, but preferably on the low side of the frequency for peak resonance. The advantages pointed out for this arrangement in the introductory portion of this specification are thereby gained. Also, of course, the vibration generator G" is again so designed in relation to the balance of the system as to avoid a magnitude of output power such as would tend to push operation up to and possibly over the frequency for peak resonance. Also, and as earlier discussed, the electric drive motor for the generator G" is preferably an induction motor, or a series-wound motor, having inverse speed responsiveness to load, so as to stabilize operating frequency under varying conditions during the work cycle, also as previously set forth in considerable detail.

In the operation of the system of FIGS. 9 and 10, the resonator rod 175 applies a unidirectional bias force to the pipe to be driven, obtained from a force-exerting means of the same nature as described in connection with FIG. 7, and this unidirectional force in combination with the periodic force exerted by the extremity of the resonator rod 175 on the pipe 178 move the pipe 178 forwardly through the earth. In this case, as in the forms of the invention disclosed in FIGS. 1–7, the driven member, here the pipe, does not normally participate in a resonance phenomenon in coaction with the medium into which it is being driven, though resonance in the balance of the vibratory system, i.e., in the acoustic circuit 175, G", 121a, Ia, is of paramount importance. Instead, the pipe in engagement with the earth material comprises the load on the resonator, and this load of course, in common with the insert of the earlier embodiments, has both resistive and reactive components. These reactances vary, in the same manner as do those in the earlier described insert driving systems, and the orbital mass generator G" accommodates automatically for these in the manner described previously in complete detail.

It will be understood that the drawings and description are merely illustrative of a number of typical applications of the invention, and it will be understood that various changes in design, structure and arrangement may be made without departing from the spirit and scope of the invention as defined in the appended claims.

I claim:
1. A vibratory system for introducing an insert into a plastic compliant body, comprising:
   an elastically vibratory resonator structure having mass and compliance in a discrete acoustic circuit so as to be elastically vibratory in a resonant frequency range;
   means for acoustically coupling a vibratory portion of said resonator to said insert in engagement with said plastic compliant body so that a mass reactive and energy dissipative load is placed on said resonator, whereby a periodic force is applied to said insert;
   a mechanical-vibration generator having a vibratory moving part therein and said moving part being coupled to said resonator so that the vibratory force of said moving part is delivered to said resonator;
   a power source operable to drive said vibration generator at the resonant frequency of said resonator when loaded by said insert; and
   means included in said system for exerting a unidirectional bias force on said insert, in the direction of desired penetration into said body, in superimposition to said periodic force.

2. The subject matter of claim 1, wherein said insert has a maximum length dimension which is substantially less than a quarter-wavelength of a longitudinal wave in the material of the insert, whereby the vibration imparted to said insert is essentially of a bodily type.

3. A vibratory system for introducing an insert into a plastic compliant body, comprising:
   an elastically vibratory resonator structure having mass and compliance combined in a discrete acoustic circuit so as to be elastically vibratory in a resonant frequency range;
   said resonator comprising an elastically vibratory bar to which said generator is coupled and in which a resonant standing wave can be established by operation of said generator;
   means for acoustically coupling a vibratory portion of said resonator to said insert in engagement with said plastic compliant body so that a mass reactive and energy dissipative load is placed on said resonator, whereby a periodic force is applied to said insert;
   a mechanical-vibration generator having a vibratory moving part therein and said moving part being coupled to said resonator so that the vibratory force of said moving part is delivered to said resonator;
   a power source operable to drive said vibration generator at the resonant frequency of said resonator when loaded by said insert; and
   means included in said system for exerting a unidirectional bias force on said insert, in the direction of desired penetration into said body in superimposition to said periodic force.

4. The subject matter of claim 3, wherein said generator is of an orbital-mass type, generating a rotating force vector applied to the bar with an alternating component thereof oriented in the direction of vibration of said resonant standing wave.

5. A system for longitudinally vibrating an elongated pinlike member, comprising:
   an elastically vibratory resonator bar disposed transversely to the axis of said member, said bar being subject to resonant elastic standing wave vibrations in a lateral mode in a plane including said member, said standing wave having nodes and antinodes, and said bar being coupled to said member in the region of an antinode of said standing wave;
   a vibration generator acoustically drivingly coupled to said bar near an antinode of said standing wave and operable at the resonant frequency of said standing wave; and
   means for applying bias loading to said member in a direction longitudinally thereof.

6. The subject matter of claim 5, wherein said bar is vibrated in a full-wavelength lateral standing wave mode, with velocity antinodal regions at the extremeities and center of the bar, and with velocity nodal regions intervening between said antinodal regions; and
   said bar being coupled to said stem near the velocity antinodal region at the center of the bar.

7. The subject matter of claim 5, wherein said bar is vibrated in a full-wavelength lateral standing wave mode, with velocity antinodal regions at the extremities and center of the bar, and with velocity nodal regions intervening between said antinodal regions;
   said bar being coupled to said stem near the velocity antinodal region at the center of the bar; and
   said means for applying bias loading to said stem comprising unidirectional force exerting means acting on the bar at said nodal regions thereof.

8. The subject matter of claim 5, wherein:
   said resonator comprises an elastic bar;
   said vibration generator being coupled to said bar so as to deliver to the bar a cyclic force having a component oriented longitudinally of the bar; and
   said vibration generator being operative at a resonant frequency of the bar for a mode of resonant longitudinal standing wave vibration of the bar.

9. A vibratory system for introducing an insert into a plastic compliant body, comprising:
   an elastic bar disposed transversely to the axis of said insert;
   a vibration generator coupled to said bar so as to deliver to said bar a cyclic force having a component parallel to the axis of said insert, said vibration generator being operative at a resonant frequency of said bar for a mode of resonant lateral standing wave vibration of said bar;
   means for acoustically coupling a vibratory portion of said resonator to said insert in engagement with said plastic compliant body so that a mass reactive and energy dissipative load is placed on said resonator, whereby a periodic force is applied to said insert;
   a mechanical-vibration generator having a vibratory moving part therein and said moving part being coupled to said resonator so that the vibratory force of said moving part is delivered to said resonator;
   a power source operable to drive said vibration generator at the resonant frequency of said resonator when loaded by said insert; and
   means included in said system for exerting a unidirectional bias force on said insert, in the direction of desired penetration into said body, in superimposition to said periodic force.

References Cited

UNITED STATES PATENTS

| | | | |
|---|---|---|---|
| 3,169,589 | 2/1965 | Bodine | 175—56 X |
| 3,184,353 | 5/1965 | Balamuth et al. | 29—526 X |
| 3,224,086 | 12/1965 | Balamuth | 29—525 |
| 3,233,012 | 2/1966 | Bodine | 264—23 |
| 3,283,833 | 11/1966 | Bodine | 175—56 |

CHARLES E. O'CONNELL, Primary Examiner.

RICHARD E. FAVREAU, Assistant Examiner.

U.S. Cl. X.R.

29—526; 175—19